US008544964B2

(12) United States Patent
Rekow et al.

(10) Patent No.: US 8,544,964 B2
(45) Date of Patent: Oct. 1, 2013

(54) BRAKE CONTROL SYSTEM FOR DUAL MODE VEHICLE

(75) Inventors: Andrew Karl Wilhelm Rekow, Cedar Falls, IA (US); Troy Eugene Schick, Cedar Falls, IA (US); Richard Vallieres, Waterloo, IA (US); Timothy Diller, Waterloo, IA (US)

(73) Assignee: Deere & Company, Moline, IL (US)

( * ) Notice: Subject to any disclaimer, the term of this patent is extended or adjusted under 35 U.S.C. 154(b) by 642 days.

(21) Appl. No.: 12/825,884

(22) Filed: Jun. 29, 2010

(65) Prior Publication Data

US 2011/0316327 A1    Dec. 29, 2011

(51) Int. Cl.
    *B60T 11/20*    (2006.01)
(52) U.S. Cl.
    USPC ............................ 303/14; 303/122.04; 303/20
(58) Field of Classification Search
    USPC .............. 303/122.04–122.05, 14, 20, DIG. 9, 303/3, 15
    See application file for complete search history.

(56) References Cited

U.S. PATENT DOCUMENTS

| 3,545,817 | A |   | 12/1970 | Yarber |           |
|-----------|---|---|---------|--------|-----------|
| 5,211,449 | A | * | 5/1993  | Amtsfeld | 303/9.66 |
| 5,469,356 | A |   | 11/1995 | Hawkins et al. |    |
| 5,952,799 | A | * | 9/1999  | Maisch et al. | 318/362 |
| H1912     | H | * | 11/2000 | Arndt  | 303/3     |
| 6,293,633 | B1 | * | 9/2001  | Hara et al. | 303/113.2 |
| 6,390,571 | B1 | * | 5/2002  | Murphy | 303/126   |
| 6,663,192 | B2 | * | 12/2003 | Bourguet et al. | 303/15 |
| 6,672,688 | B2 | * | 1/2004  | Gale et al. | 303/126 |
| 6,871,917 | B2 | * | 3/2005  | Giers et al. | 303/122.04 |
| 6,988,583 | B2 |   | 1/2006  | Turner |           |
| 7,073,623 | B2 |   | 7/2006  | Turner |           |
| 7,499,804 | B2 |   | 3/2009  | Svendsen et al. |  |
| 7,869,927 | B2 | * | 1/2011  | Uematsu | 701/70   |
| 7,871,135 | B2 | * | 1/2011  | Nishio et al. | 303/11 |
| 2002/0050739 | A1 | * | 5/2002 | Koepff et al. | 303/122.09 |
| 2002/0175561 | A1 | * | 11/2002 | Jensen | 303/113.1 |
| 2004/0100146 | A1 | * | 5/2004 | Giers et al. | 303/122 |
| 2008/0048491 | A1 | * | 2/2008 | Matsubara et al. | 303/14 |
| 2011/0187180 | A1 | * | 8/2011 | Frank  | 303/2    |

FOREIGN PATENT DOCUMENTS

| DE | 10036287 | 2/2002 |
| DE | 69524335 | 8/2002 |

OTHER PUBLICATIONS

German Search report (5 pages).

* cited by examiner

*Primary Examiner* — Bradley King

(57) ABSTRACT

A brake control system is provided for a utility vehicle having manned and unmanned operational modes. The brake control system includes a hydraulically operated brake. A manually operated brake circuit and an electro-hydraulic (E-H) brake circuit are connected to the brake. The E-H brake circuit includes a pump, a solenoid operated inlet valve, an accumulator, and first and second solenoid operated brake valve connected between the brake and the inlet valve. A first CPU is operatively connected to the inlet valve and to the first brake valve. A second CPU is operatively connected to the inlet valve and to the second brake valve. An accumulator pressure sensor senses the accumulator pressure. A brake pressure sensor senses brake pressure. The first and second CPUs control the inlet valve and the brake valves as a function of the sensed accumulator pressure and brake pressure.

13 Claims, 1 Drawing Sheet

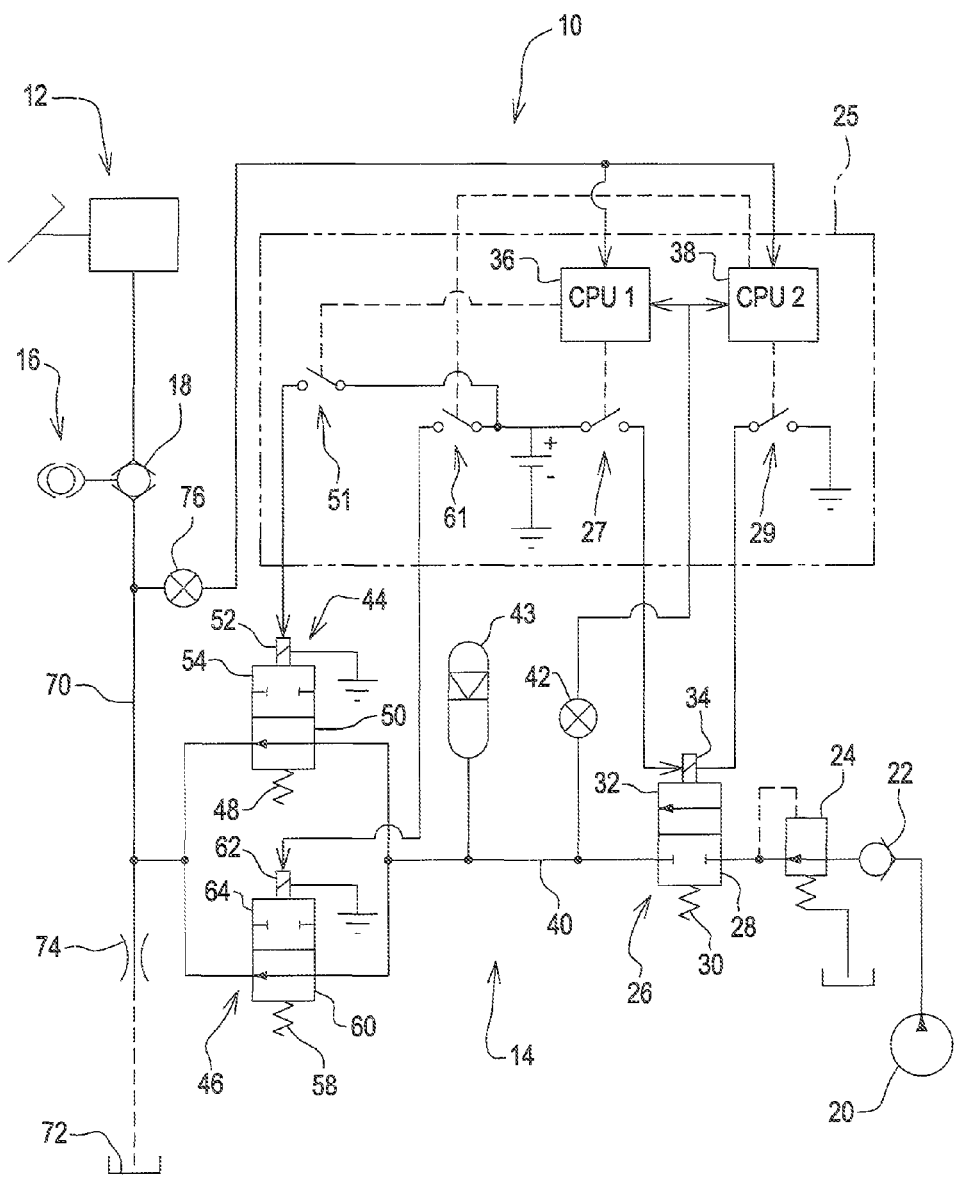

BRAKE CONTROL SYSTEM FOR DUAL MODE VEHICLE

FIELD OF THE INVENTION

The present invention relates to a brake control system for a vehicle capable of both manned and unmanned operation.

BACKGROUND OF THE INVENTION

Some vehicles can be selectively controlled by an operator (manned) or autonomously controlled (unmanned). Such a dual mode vehicle must have a braking system which can safely control the vehicle in both situations. This requires a brake system which includes an electro-hydraulic (E-H) braking system which operates in parallel with the manual braking system. A control system with redundant central processing units (CPUs) has been proposed for use in such a vehicle. In such a vehicle, it is desired that E-H braking system meet two criteria. First, when in operating in autonomous mode, a single CPU must be able engage the brakes in the event of a single point failure. Otherwise, inability to bring the vehicle to a halt with the E-H braking system during unmanned operation may lead to an unsafe condition. Second, when the vehicle is manned, it should not be possible for a single CPU to engage the brakes in the event of a single point failure. When operating in manned mode, suddenly applying the brakes at high speed may result in loss of control of the vehicle by the operator. The operator should retain control of the existing manual brakes during manned operation.

SUMMARY

Accordingly, an object of this invention is to provide a steering control system which meets the above criteria for a vehicle capable of both manned and un-manned operation.

This and other objects are achieved by the present invention, wherein a brake control system is provided for a utility vehicle having manned and unmanned operational modes. The brake control system includes a hydraulically operated brake, a manually operated brake circuit connected to the brake, and an electro-hydraulic (E-H) brake circuit connected to the brake. The E-H brake circuit includes a pump; a solenoid operated inlet valve having an outlet and having an inlet connected to the pump, an accumulator connected to the outlet of the inlet valve, a first solenoid operated brake valve having an outlet connected to the brake and having an inlet connected to the outlet of the inlet valve, and a second solenoid operated brake valve having an outlet connected to the brake and having an inlet connected to the outlet of the inlet valve.

A first central processing unit (CPU) is operatively connected to the solenoid of the inlet valve and to the solenoid of the first brake valve. A second CPU is operatively connected to the solenoid of the inlet valve and to the solenoid of the second brake valve. An accumulator pressure sensor senses a pressure in the accumulator and generates an accumulator pressure signal. A brake pressure sensor senses a pressure in the brake and generates a brake pressure signal. The first and second CPUs control the inlet valve and the brake valves as a function of the accumulator pressure signal and the brake pressure signal.

The inlet valve is normally closed and is opened in response to activation by either of the CPUs. The first brake valve is normally open and is closed in response to activation by the first CPU, and the second brake valve is normally open and is closed in response to activation by the second CPU.

A first switch is connected between a battery and the solenoid of the inlet valve, and a second switch is connected between a ground and the solenoid of the inlet valve. The first CPU is operatively connected to the first switch, and the second CPU is operatively connected to the second switch. A third switch is connected between the battery and the solenoid of the first brake valve, and a fourth switch is connected between the battery and the solenoid of the second brake valve. The first CPU is operatively connected to the third switch, and the second CPU is operatively connected to the fourth switch.

With this system, when in operating in autonomous mode, a single CPU is able engage the brakes in the event of a single point failure. With this system, when the vehicle is manned, a single CPU cannot engage the brakes in the event of a single point failure.

BRIEF DESCRIPTION OF THE DRAWINGS

The sole FIGURE is a schematic diagram of a brake control system according to the invention.

DESCRIPTION OF THE PREFERRED EMBODIMENT

Referring to FIG. 1, a brake system 10 is provided for a vehicle (not shown) capable of manned and unmanned operation. The brake system 10 includes a conventional manually operated brake circuit 12 and an electro-hydraulic (E-H) brake circuit 14, both connected to a vehicle brake 16 through a shuttle valve 18 which communicates to the brake 16 the brake circuit 12 or brake circuit 14, whichever has the highest hydraulic pressure. The E-H brake system 14 is hydraulically plumbed in parallel with the manual brake system 12.

The E-H brake circuit 14 includes a pump 20 and a check valve 22 which permits one-way flow of brake fluid from the pump 20 to a pressure reducing valve 24. Valve 24 communicates fluid to a solenoid operated inlet valve 26. Valve 26 is biased into a normally closed position 28 by a spring 30 and is moved to an open position 32 by a solenoid 34.

Solenoid 34 is controlled by remote start controller (RSC) 25 which includes redundant central processing units (CPU) 36 and 38. RSC 25 also includes a switch 27 connected between the vehicle battery and the solenoid 34 and a switch 29 connected between the vehicle ground and the solenoid 34. Switch 27 is controlled by CPU 36 and switch 29 is controlled by CPU 38. The vehicle (not shown) may be started for autonomous operation by a remote starter unit (not shown) which communicates in a wireless manner with the RSC 25. During manual operation, the vehicle (not shown) may be started by means of a conventional ignition key switch (not shown).

Fluid line 40 is connected to an outlet of valve 26. An accumulator pressure sensor 40 and an accumulator 42 are connected to line 40. Accumulator pressure sensor 40 transmits a pressure signal to the CPUs 36 and 38.

Line 40 is connected to the inlets of a pair of parallel connected first brake valve 44 and second brake valve 46. A spring 48 biases first brake valve 44 to a closed position 50. A solenoid 52 is operable to move valve 44 to its open position 54. A spring 58 biases second brake valve 46 to a closed position 60. A solenoid 62 is operable to move valve 46 to its open position 64. RSC 25 also includes a switch 51 connected between the vehicle battery and the solenoid 52 and a switch 61 connected between the vehicle battery and the solenoid 62. Switch 51 is controlled by CPU 36 and switch 61 is controlled by CPU 38.

The outlets of first and second brake valves 44 and 46 are connected by fluid line 70 to the shuttle valve 18. Line 70 is also communicated to reservoir 72 by an orifice 74. A brake pressure sensor 76 is connected to line 70 and generates a brake pressure signal which is transmitted to the CPUs 36 and 38. The two normally open valves 44 and 46 are plumbed in parallel. Each of the valves 44 and 46 is controlled by a separate one of CPUs 36 and 38. In this manner, when the accumulator 43 is charged, either CPU 36 or 38 has the ability to apply the brake 16.

The E-H inlet valve 26 is a normally closed valve which isolates the accumulator 43 from the pump 20. During manual operation, the inlet valve 26 remains closed to isolate the E-H braking system 14 to prevent unintentional actuation of the brake 16 by either of CPUs 36 and 38. During autonomous operation, both CPUs 36 and 38 must agree to open the valve 26 in order to charge the accumulator 43. The accumulator 43 provides a source of hydraulic pressure in the case of loss of pump hydraulic pressure. This accumulator 43 stores enough fluid pressure to apply the brakes 16 once in order to bring the vehicle safely to a halt in case of an emergency. The accumulator 43 is only pressurized during unmanned operations. As a result, either CPU 36 or CPU 38 can apply the brakes 16 by opening the corresponding one of switches 51 or 61, and thereby opening the corresponding first brake valve 44 or second brake valve 46.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A brake control system for a utility vehicle having manned and unmanned operational modes, the brake control system comprising:
   a hydraulically operated brake;
   a shuttle valve in hydraulic communication with the brake;
   a manually operated brake circuit connected to the brake via the shuttle valve; and
   an electro-hydraulic (E-H) brake circuit connected to the brake via the shuttle valve, the E-H brake circuit comprising:
   a pump;
   a solenoid operated inlet valve having an outlet and having an inlet connected to the pump;
   an accumulator connected to the outlet of the inlet valve;
   a first solenoid operated brake valve having an outlet connected to the brake and having an inlet connected to the outlet of the inlet valve;
   a second solenoid operated brake valve having an outlet connected to the brake and having an inlet connected to the outlet of the inlet valve;
   a first central processing unit (CPU) operatively connected to the solenoid of the inlet valve and to the solenoid of the first brake valve;
   a second CPU operatively connected to the solenoid of the inlet valve and to the solenoid of the second brake valve;
   an accumulator pressure sensor for sensing a pressure in the accumulator and generating an accumulator pressure signal; and
   a brake pressure sensor for sensing a pressure in the brake and generating a brake pressure signal, the first and second CPUs controlling the inlet valve and the brake valves as a function of the accumulator pressure signal and the brake pressure signal.

2. The brake control system of claim 1, wherein:
   the inlet valve is normally closed and is opened in response to activation by either of the CPUs.

3. The brake control system of claim 1, wherein:
   the first brake valve is normally open and is closed in response to activation by the first CPU; and
   the second brake valve is normally open and is closed in response to activation by the second CPU.

4. The brake control system of claim 1, further comprising:
   a first switch connected between a battery and the solenoid of the inlet valve; and
   a second switch connected between a ground and the solenoid of the inlet valve, the first CPU being operatively connected to the first switch, and the second CPU being operatively connected to the second switch.

5. The brake control system of claim 4, further comprising:
   a third switch connected between the battery and the solenoid of the first brake valve; and
   a fourth switch connected between the battery and the solenoid of the second brake valve, the first CPU being operatively connected to the third switch, and the second CPU being operatively connected to the fourth switch.

6. A brake control system for a utility vehicle having manned and unmanned operational modes, the brake control system comprising:
   a hydraulically operated brake;
   a shuttle valve in hydraulic communication with the brake;
   a manually operated brake circuit connected to the brake via the shuttle valve; and
   an electro-hydraulic (E-H) brake circuit connected to the brake via the shuttle valve, the E-H brake circuit comprising:
   a pump;
   an inlet valve having an outlet and having an inlet connected to the pump;
   a first brake valve having an outlet connected to the brake and having an inlet connected to the outlet of the inlet valve;
   a second brake valve having an outlet connected to the brake and having an inlet connected to the outlet of the inlet valve;
   a first central processing unit (CPU) operatively connected to the inlet valve and to the first brake valve; and
   a second CPU operatively connected to the inlet valve and to the second brake valve, the first and second CPs controlling the inlet valve and the brake valves.

7. The brake control system of claim 6, further comprising:
   an accumulator connected to the outlet of the inlet valve.

8. The brake control system of claim 6, wherein:
   the inlet valve is normally closed and is opened in response to activation by either of the CPUs.

9. The brake control system of claim 6, wherein:
   the first brake valve is normally open and is closed in response to activation by the first CPU; and
   the second brake valve is normally open and is closed in response to activation by the second CPU.

10. The brake control system of claim 6, further comprising:
    a first switch connected between a battery and a solenoid of the inlet valve; and
    a second switch connected between a ground and the solenoid of the inlet valve, the first CPU being operatively connected to the first switch, and the second CPU being operatively connected to the second switch.

11. The brake control system of claim 10, further comprising:

a third switch connected between the battery and a solenoid of the first brake valve; and a fourth switch connected between the battery and a solenoid of the second brake valve, the first CPU being operatively connected to the third switch, and the second CPU being operatively connected to the fourth switch.

12. A brake control system for a utility vehicle having manned and unmanned operational modes, the brake control system comprising:

a hydraulically operated brake;

a manually operated brake circuit connected to the brake; and an electro-hydraulic (E-H) brake circuit connected to the brake, the E-H brake circuit comprising:

a pump;

a solenoid operated inlet valve having an outlet and having an inlet connected to the pump;

an accumulator connected to the outlet of the inlet valve;

a first solenoid operated brake valve having an outlet connected to the brake and having an inlet connected to the outlet of the inlet valve;

a second solenoid operated brake valve having an outlet connected to the brake and having an inlet connected to the outlet of the inlet valve;

a first central processing unit (CPU) operatively connected to the solenoid of the inlet valve and to the solenoid of the first brake valve;

a second CPU operatively connected to the solenoid of the inlet valve and to the solenoid of the second brake valve;

an accumulator pressure sensor for sensing a pressure in the accumulator and generating an accumulator pressure signal; and a brake pressure sensor for sensing a pressure in the brake and generating a brake pressure signal, the first and second CPUs controlling the inlet valve and the brake valves as a function of the accumulator pressure signal and the brake pressure signal;

a first switch connected between a battery and the solenoid of the inlet valve; and a second switch connected between a ground and the solenoid of the inlet valve, the first CPU being operatively connected to the first switch, and the second CPU being operatively connected to the second switch.

13. A brake control system for a utility vehicle having manned and unmanned operational modes, the brake control system comprising:

a hydraulically operated brake;

a manually operated brake circuit connected to the brake; and an electro-hydraulic (E-H) brake circuit connected to the brake, the E-H brake circuit comprising:

a pump;

an inlet valve having an outlet and having an inlet connected to the pump;

a first brake valve having an outlet connected to the brake and having an inlet connected to the outlet of the inlet valve;

a second brake valve having an outlet connected to the brake and having an inlet connected to the outlet of the inlet valve;

a first central processing unit (CPU) operatively connected to the inlet valve and to the first brake valve;

a second CPU operatively connected to the inlet valve and to the second brake valve, the first and second CPs controlling the inlet valve and the brake valves;

a first switch connected between a battery and a solenoid of the inlet valve; and a second switch connected between a ground and the solenoid of the inlet valve, the first CPU being operatively connected to the first switch, and the second CPU being operatively connected to the second switch.

* * * * *